O. J. MOE.
BRAKE OPERATING MEANS.
APPLICATION FILED AUG. 28, 1914.
1,184,005.
Patented May 23, 1916.
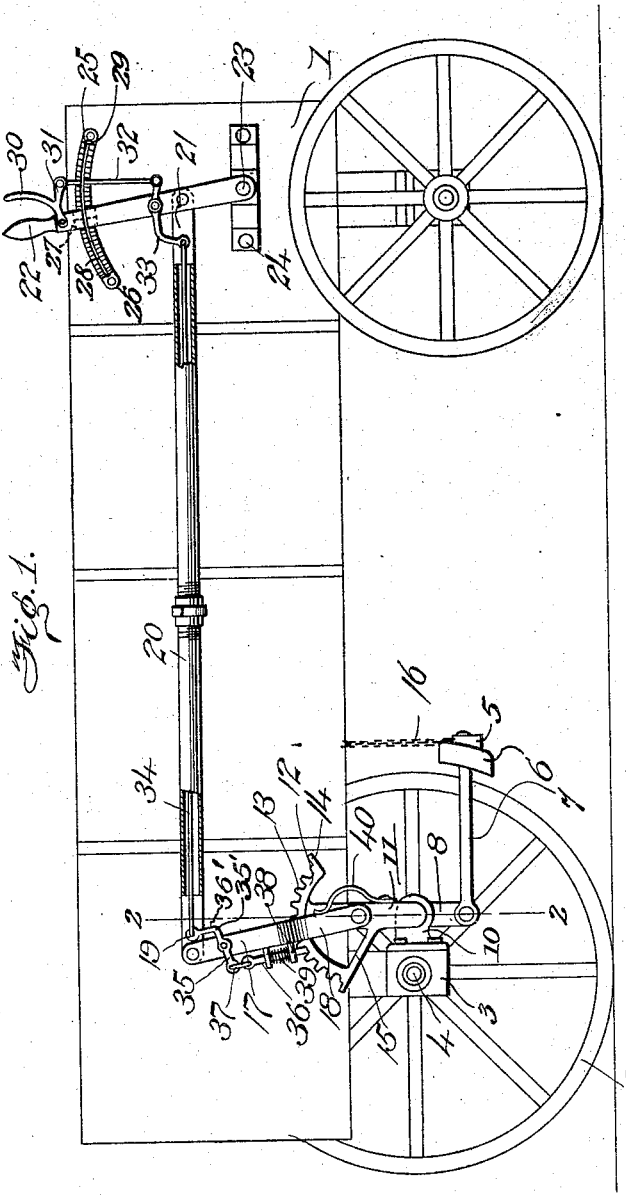
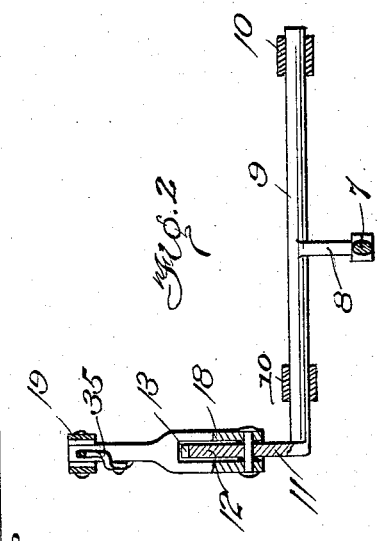
Witnesses
Wm H. Mulligan
Warner I. Cubberley
Inventor
Oscar J. Moe
By Richard B. Owen.
Attorney

UNITED STATES PATENT OFFICE.

OSCAR J. MOE, OF LIKELY, CALIFORNIA.

BRAKE-OPERATING MEANS.

1,184,005. Specification of Letters Patent. Patented May 23, 1916.

Application filed August 28, 1914. Serial No. 859,083.

*To all whom it may concern:*

Be it known that I, OSCAR J. MOE, a citizen of the United States, residing at Likely, in the county of Modoc and State of California, have invented certain new and useful Improvements in Brake-Operating Means, of which the following is a specification.

My invention relates to adjustable brakes.

The primary object of my invention contemplates a brake which may be adjusted from the seat of a vehicle to exert any desired pressure upon the wheels.

Another object of my invention resides in the provision of an adjustable brake wherein the adjusting means although acting simultaneously with the operation of the brake is independent in the performance of its functions.

A further object of my invention resides in the provision of an adjustable brake which upon releasing of the adjusting means automatically returns the brake to a non-binding position.

A still further object of my invention contemplates the provision of an adjustable brake which is simple in construction, has no parts which may be easily rendered inapt for use by the effect of deleterious extraneous substances or conditions, and one which may be easily manufactured and placed on the market at a very small cost.

With these and other objects in view my invention contemplates such details in construction, combination, and arrangement of parts as will be illustrated in the accompanying drawings, set forth in the specification and in the appended claims.

In the accompanying drawings wherein is illustrated the preferred embodiment of my invention; Figure 1 is a side view of my invention showing the same as disposed upon a vehicle with all parts assembled but with some portions thereof broken away to show to advantage various details in construction. Fig. 2 is a sectional view on the line 2—2 of Fig. 1. Fig. 3 is a perspective view of the bifurcated plate spring.

In the drawings like characters of reference designate like or corresponding parts throughout the several views.

In order to illustrate the application of my invention I have shown it applied to a vehicle having a body portion 1, rear wheels 2, axle casing 3, and hub 4.

Disposed in operative position in relation to the rear wheels 2 is a brake beam 5 which has secured upon each extremity a brake shoe 6, which may be of any desired type. Midway the extremities of the brake beam 5 I have rigidly secured a brake rod 7. The free end of the said brake rod 7 is pivotally connected to the end of the lever 8, which lever 8 is integrally formed midway the extremities of the rotatably mounted operating shaft 9 and extends downwardly therefrom. The operating shaft 9 is revolubly carried and supported within bearing brackets 10 disposed in spaced relation upon the axle casing 3 before referred to. Upon one end of the operating shaft 9 is an upstanding arm 11. The arm 11 is integrally formed upon the said operating shaft 9. Upon the free end of the arm 11 is integrally carried a segmental rack 12 which has teeth 13 and abutments 14 formed thereon. In order to bring forth the functions of my invention I dispose the segmental rack 12 with its major portion rearwardly of its connection with the arm 11. The extremity of the major portion is supported by means of the section 15. It is evident that the entire mechanism described is liable to move circumferentially in a downward position because of the weight of the brake shoes and beam. To prevent this I provide suspension chains 16 which secure said brake beam to the bottom of the wagon.

In order, at predetermined times, to actuate the brake mechanism *per se* I provide an actuating lever 17 which is bifurcated as at 18 at its lower end. The arms of said bifurcation 18 are pivotally secured to the arm 11 and are so disposed with respect to the segmental rack 12 that upon movement of the same no engagement is had therewith. The free end of the actuating lever 17 is pivotally secured between the arms of the bifurcation 19 formed in the extremity of the actuating rod 20. The said actuating rod 20 is hollow and cylindrical and is of such a length that it will extend to a point adjacent the front end of the wagon. The other end of the actuating rod 20 is also bifurcated as at 21. Pivotally secured between the arms of the other bifurcation 21 and the actuating rod 20 is a hand lever 22. The said point of pivot between the hand lever 22 and the bifurcation 21 being midway the extremities of the said hand lever. The lower extremity of the hand lever 22 is pivotally secured as at 23 to the bracket 24 which is rigidly carried upon the body of the wagon.

In order to retain the hand lever 22 in position and to bring forth the functions which will be hereinafter set forth I provide an arcuate rack 25 having legs 26 which are rigidly secured to the body of the wagon. Operating upon said arcuate rack 25 and secured upon the hand lever 22 is the dog 27 which is adapted to limit the movement of the hand lever to the will of the operator. In order to retain the hand lever in position opposite the rack dog into binding but movable engagement with the arcuate rack 25 I provide a resilient inclosing bracket 28 which has inwardly bent portions 29 formed on its extremities for attachment to the legs 26 of the said arcuate rack. It will be seen that upon actuation of the hand lever 22, movement in the same direction is effected upon the actuating rod 20 which transmits a corresponding movement to the actuating lever 17. In order to move the brake mechanism it is necessary to rigidly secure, at times the said lever 17 in engagement therewith. To this end I provide a tripping handle 30 which is carried upon the handle 22 and has a projection 31 formed thereon. Pivotally secured to the projection 31 is a link 32 which is pivotally engaged with the crank lever 33 which is pivotally secured to the hand lever 22. Extending through the hollow portion of the actuating rod 20 and having pivotal engagement with the free end of the bell crank lever 33, is the connecting link 34, which has rearward termination adjacent the actuating lever 17. Pivotally secured to the rear terminal of the connecting link 34 is the bell crank lever 35, the said bell crank lever 35 being pivotally carried adjacent the outer extremity of the actuating lever 17 and having its arms bent inwardly as at 35' from the body portion thereof in order to aline the said arm with respect to said connecting link. Upon the free arm of the bell crank lever 35 is movably carried the pin 36, movement being allowed, because of a link connection therebetween in the form of a ring 37. The shank of the pin 36 is carried within the bracket 38 which is rigidly secured to the body portion of the actuating lever 17. Said pin is adapted for engagement with said teeth 13 of the segmental rack 12 and is normally held in engagement therewith by means of the spring 39, as is evident. Upon actuation of the tripping handle the connecting link 34 is moved in a forward direction, thus withdrawing the pin 36 from engagement with the teeth 13 of the segmental rack 12, thereby allowing independent movement of the said rack and brake *per se* with respect to the actuating lever 17; but upon releasing the tripping handle 30 the pin is again forced in engagement with one of the teeth 13 because of the action of the spring 39, thus rigidly securing the actuating lever with the segmental rack and consequently with the arm and brake mechanism. It is desirable generally to provide the greatest radius of operation with respect to the brake mechanism to the actuating lever 17 and to attain this end I provide a bifurcated plate brake 40 which is rigidly secured to the arm 11 and is bifurcated to form opposite arms for engagement with the said actuating lever 17, thus tending at all times to force it in a rearward position.

When desiring to force the brake into engagement with the wheels, movement is effected in a forward direction through the medium of the actuating rod, in a forward position and because of the fact that rigid engagement is had through the medium of the pin as engaged with the segmental rack 12 and the arm 11 a corresponding movement will be effected thereupon thus causing the operating shaft 9 to move the lever 8 to take a rearward position thus drawing the brake beam in a corresponding direction and placing the brake shoes in binding engagement with the wheels, thereby stopping the vehicle. When desiring to release the brake, the tripping handle 30 is pressed, consequently withdrawing the pin 36 from engagement with said rack 12 and allowing the brake to be released from binding engagement with the wheels. Should it be desired to exert the greatest pressure possible upon the wheels, the pin 36 is disposed in engagement with the rear most tooth 13 of the segmental rack 12, thereby allowing the greatest radius of operation, but should it be desired to put but little pressure upon the vehicle wheels the pin 36 is placed in engagement with a more forward tooth 13 of the rack 12 thus limiting the radius of operation and causing a correspondingly slight pressure upon the wheels.

Having thus described the specific details in construction, combination and arrangement of parts in the preferred embodiment of my invention and realizing that conditions coincident with its reduction to practice may vary and necessitate slight changes I desire to reserve unto myself the right to make such changes provided they fall within the scope of the appended claims.

I claim:

1. The combination of a shaft, a segmental rack projecting upwardly from one end of said shaft, a lever pivotally mounted about said rack, a spring pressed pin movably mounted on said lever for engagement with said rack, in order to effect a rigid engagement at predetermined times between said rack and said lever, a hollow actuating rod pivotally secured to said lever for moving the same at the will of the user, a link mounted within said actuating rod and pivotally connected with said pin for disengagement of said pin from said rack at predetermined times in order to effect movement between said rack and said lever, and means for holding said lever in operative position.

2. The combination of a shaft, a rack mounted upon one end of said shaft, a lever mounted about said rack, means mounted on said lever for engagement with said rack, in order to effect a rigid engagement at predetermined times between said rack and said lever, an actuating rod pivotally secured to said lever, a link mounted within said actuating rod and pivotally connected with said pin for disengagement of said pin from said rack at predetermined times, and means for locking said lever in operative position.

In testimony whereof I affix my signature in presence of two witnesses.

OSCAR J. MOE.

Witnesses:
EVERETT L. BOOTH,
CHARLIE E. DALE.